(No Model.) 2 Sheets—Sheet 2.

J. W. HYATT.
FILTER.

No. 358,040. Patented Feb. 22, 1887.

WITNESSES:
Edward Wolff.
George Cook

INVENTOR
John W. Hyatt
BY Rowland Cox
ATTORNEY

UNITED STATES PATENT OFFICE.

JOHN W. HYATT, OF NEWARK, NEW JERSEY, ASSIGNOR TO THE NEWARK FILTERING COMPANY, OF SAME PLACE.

FILTER.

SPECIFICATION forming part of Letters Patent No. 358,040, dated February 22, 1887.

Application filed May 25, 1885. Renewed December 30, 1885. Again renewed July 31, 1886. Serial No. 209,712. (No model.)

*To all whom it may concern:*

Be it known that I, JOHN W. HYATT, a citizen of the United States, and a resident of Newark, in the county of Essex and State of New Jersey, have invented certain new and useful Improvements in Filters, of which the following is a specification.

My invention relates to an improvement in filters, and more particularly to an improvement in the kind of filters shown and described in Letters Patent granted to me March 6, 1883, and numbered 273,542.

In the above-mentioned patents I have shown and described filters so constructed that when desired the bed of filtering material may be carried to a supposed tank by the action of the water, and there thoroughly agitated and cleansed of all silt and foreign matter extracted from the water in its passage through the filter. After the bed has been thoroughly washed and cleansed the sand or other material of which it is composed is transferred to the filter below, where it will be in condition for further use.

The object of my present invention is to provide means whereby the sand or other material may be easily and readily transferred to the tank, where it will be greatly agitated by the water and thoroughly cleansed, and, further, to provide means for allowing the sand or other material to return to the filter, and also for preventing it from remaining in the bottom of the tank or becoming clogged in the openings leading from the tank into the filter.

With these ends in view my invention consists in certain novel features of construction and combinations of parts, as will be hereinafter fully described, and pointed out in the claims.

Figure 1:
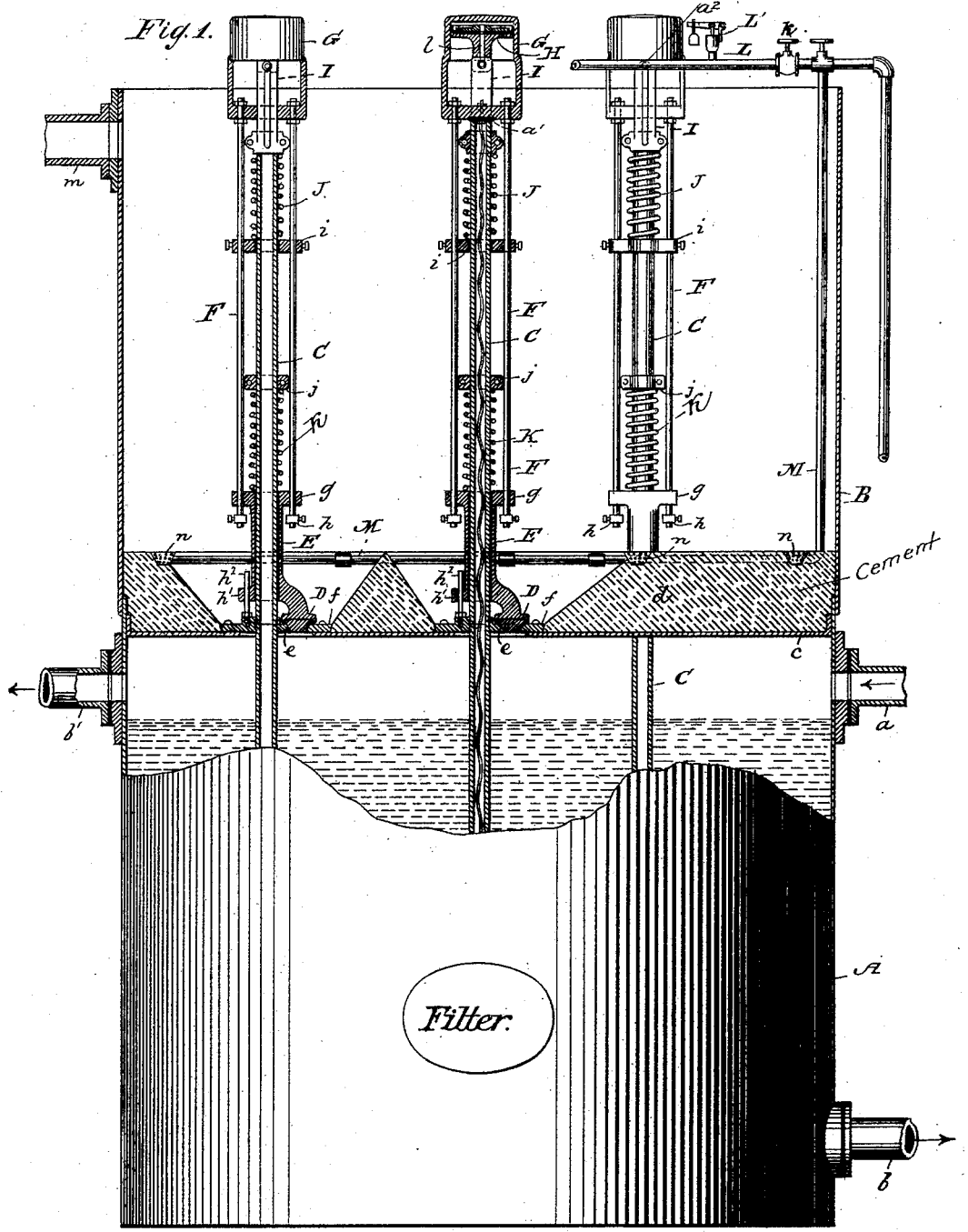
Figure 2:
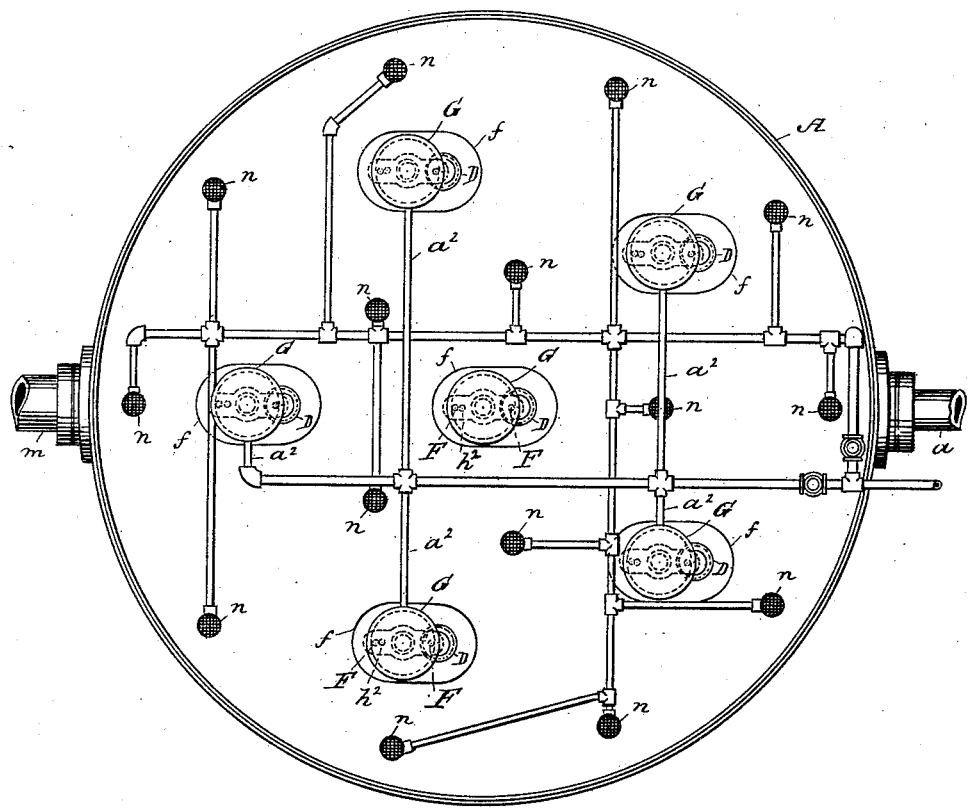
Figure 3:
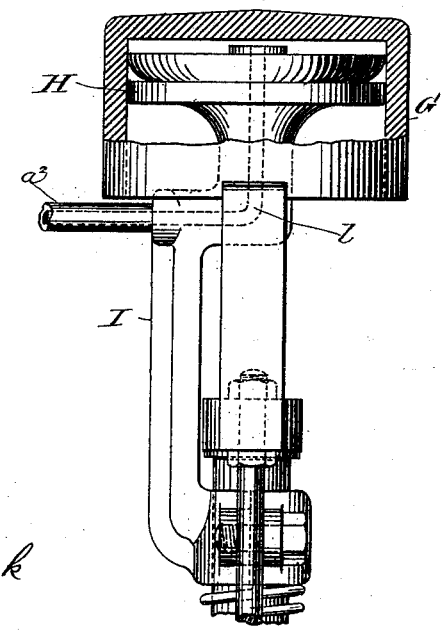

In the accompanying drawings, Figure 1 represents my improvement partly in section and partly in elevation. Fig. 2 represents a top plan view thereof, showing the relative arrangement of the water-cylinders for operating the valves between the filter and tank. Fig. 3 represents a detached side view of a bracket adapted to keep the upper ends of the sand-pipes closed.

A represents the filter proper, built of any desired dimensions, and into the upper portion of which leads the supply-pipe $a$, and from the lower portion the outlet-pipe $b$, which latter conveys from the filter the water that has passed through the same. From the filter also leads the outlet-pipe $b'$, through which is permitted to escape the water that is first passed into the filter after the cleaning process has been completed.

To the upper portion of the filter is secured the head $c$ and the tank B, the head $c$ being preferably coated on its upper surface with a layer of cement, $d$, or its equivalent. Through the head $c$ pass the pipes C, which are rigidly secured thereto, and have their lower ends extending within a short distance of the bottom of the filter, and their upper ends to the top of the tank B.

D represents cone-valves adapted to open and close openings $e$, formed in the head $c$, and also in the plates $f$, secured to the head, for the purpose of providing suitable seats for the valves, the stems E, on which the valves D are formed, being preferably made hollow, to loosely encircle the pipes C, and to allow said stems to receive a vertical movement thereon.

The layer of cement $d$, which forms the floor of the tank, is dished out around the openings $e$, for the purpose of allowing the sand, after being cleansed of its impurities, to more readily find its way through said openings into the filter below.

The upper end of each of the valve-stems is formed with outwardly-extending lugs $g$, through which are loosely passed the vertical rods F, the lower ends of the latter extending below the lugs and provided with check-nuts $h$. The lower end of the stem is formed with a projection, $h'$, through which passes the vertical rod $h^2$, secured at its lower end to the plate $f$, and adapted to guide the stem in its vertical movements. The upper ends of these rods are rigidly secured in the lower ends of the water-cylinders G, each of which rests on the upper end of one of the pipes C, the under side of said cylinder being preferably provided with a suitable packing, forming a valve, $a'$, for the purpose of keeping said pipe tightly sealed.

The lower portion of the cylinder is formed with an open side or sides, the upper portion thereof being constructed to contain the piston H, rigidly secured to the upper end of the bracket I. This bracket is formed as shown in Fig. 3 of the drawings, and has its lower end rigidly clamped to the pipes C, against which lower end fits one end of the spring J, coiled around the pipe C, the opposite end of the spring bearing against the plate $i$, rigidly clamped to the rods F, and through which loosely passes said pipe C. It will be readily seen that the tendency of this spring, one end of which is rigid with the stationary pipe C and the opposite end bearing on the plate $i$, is to keep the latter down, and by virtue of the rods F, to which said plates $i$ are secured, and which are connected with the cylinders G, to keep the latter down on the upper end of the pipe C.

To each of the pipes C, below the plate $i$, is rigidly secured a plate, $j$, against which bears the upper end of the coiled spring K, the lower end of the latter fitting against the upper end of the stem E, for the purpose of keeping the valves D down upon their seats, and preventing any portion of the water, or filter-bed when in the tank, from returning into the filter until so desired.

To the bracket I, by means of a pipe, $a^2$, is connected a water-pipe, L, leading from the supply-pipe $a$, and provided with a cut-off valve, $k$, said bracket being formed with a central passage, $l$, which also extends up through the piston H, for conveying the water into the space between the cylinder-head and piston, as shown in Fig. 1 of the drawings.

From the above description it will be readily understood that when it is desired to cleanse the filter-bed it is only necessary to cut off the outlet-pipe $b$, which is provided with a valve for that purpose, whereby the water in the filter will greatly agitate the sand or other filtering material and force it up into the pipes C. The valve K is then partially turned, allowing the water to flow through the upper portion of the bracket and piston H into the space between the upper end of the cylinder and piston, which will operate to raise the cylinder, compressing the spring J between the plate $i$ and the lower end of the bracket I until the nuts $h$ on the rods F strike or nearly strike the lugs $g$ on the valve-stem E. When the cylinder rises, the upper end of the pipe C will be uncovered, through which the water and sand from the filter below will issue and fill the tank. The water being greatly agitated, will thoroughly separate the sand and the impurities, which result will be also hastened and perfected by the friction of the particles of sand during their passage from the filter into the tank.

By means of the above arrangement the bed is thoroughly cleansed, the process being continued until the end desired is accomplished, and the waste water in the tank, together with the impurities detached from the filtering material, being permitted to escape through the pipe $m$ leading therefrom. If the valve $k$ is now completely turned, the pressure of the water will raise the cylinder still higher, which, through the intervention of the rods F, will also raise the valve D from its seat and permit the sand to return to the filter.

To the pipe L may be secured a safety-valve, L'. If the pressure of the water admitted to the cylinder for the purpose of raising the valve $a'$ should be too great, the valve L' would permit a portion of the water to escape and prevent the valves D from rising before the proper time.

For the purpose of preventing any of the sand from remaining in the tank, I connect to the pipe L pipes M, provided with suitable valves, and which extend downward within the tank, and are provided with outlets $n$, through which the water issues, thus washing all the openings in the head of the filter. After this result has been accomplished the valve $k$ is turned and the pressure in the cylinder released, which, by means of the springs J, will be returned to its normal position, the spring K at the same time pressing the valve D down upon its seat and closing the opening in the filter-bed. The area of the valves D and $a'$ will be so proportioned to the area of the piston H that the pressure on the former of the water within the filter will not be sufficient to compress the springs J K and thereby raise said valves D and $a'$; but if such pressure is applied to the increased area of the piston H the tension of the springs will be overcome, and, as before described, the valves thereby raised.

For the purpose of preventing any sand from remaining in the pipes and becoming clogged therein, I secure to the lower end of the cylinder a vertical rod, $c'$, extending downward within the pipe C, and twisted or otherwise formed with an uneven outer surface. When the cylinder is raised, the rod will also be raised and thereby loosen any sand remaining therein, and allow the pressure of the water in the filter to force it up into the tank.

In Fig. 2 I have shown a filter constructed with five pipes, C, with their respective cylinders; but I would have it understood that I do not limit myself to the exact construction, nor to the special arrangement shown, but shall make such changes as circumstances may require.

What I claim as my invention, and desire to secure by Letters Patent, is—

1. A filter consisting of an upper and a lower portion, pipes leading from the latter into the former for the purpose of transferring the filtering material, valves for covering and uncovering openings leading from one portion into the other, cylinders having pistons located therein, and supply-pipes leading thereto and connected with said former pipes for opening the upper ends of the same and operating said valves, substantially as set forth.

2. A filter consisting of an upper and a lower portion, pipes for conveying the filtering material from the latter into the former, vertically-movable cylinders loosely connected with said pipes and adapted to cover and uncover the upper ends thereof, pistons connected with the pipes, and valves connected with the cylinders for covering and uncovering openings leading from one portion of the filter into the other, substantially as set forth.

3. A filter consisting of an upper and lower portion and having pipes for transferring the filtering material from the latter into the former, vertically-acting cylinders resting on and loosely connected with said pipes and having pistons located therein, valves for covering and uncovering openings leading from one portion of the filter into the other, rods connecting said valves and cylinders, and pipes for supplying water to the cylinders for the purpose of raising the same, substantially as set forth.

4. A filter consisting of an upper and lower portion, pipes for conveying the filtering material from the latter into the former, cylinders G, containing the pistons H, secured to said pipes, valves D, formed on the stem E, and rods F, provided with check-nuts and secured to the cylinders and valve-stems and adapted to lift the valves D after the cylinders have been lifted from said pipes, substantially as set forth.

5. A filter consisting of an upper and lower portion, pipes C for transferring the filtering material, cylinders G, resting on said pipes and containing the pistons H, valves D, formed on the stems E, and adapted to cover and uncover openings leading from one portion of the filter into the other, rods F, secured at their upper ends to the cylinders and having their lower ends passing through and extending below the upper portion of the valve-stems, and the springs J K for returning the parts to their normal position, substantially as set forth.

6. A filter consisting of an upper and lower portion, pipes for transferring the filtering material from the latter into the former, valves for covering and uncovering openings leading from one portion into the other, and pipes M, located in the said upper portion, substantially as and for the purpose set forth.

7. In a filter, the combination, with the pipes C, leading from the lower into the upper portion thereof, of the cylinder G, adapted to open and close the upper end of the pipe C, piston H, located within the cylinder and rigidly connected with the pipe C by the bracket I, and provided with the passage $l$, valves D, rods F, springs J K, and the pipe L, communicating with the passage $l$, substantially as set forth.

8. In a filter, the combination, with the pipe C, leading from the lower into the upper portion thereof, of the cylinder G, adapted to rest on and close the upper end of the pipe C, piston H, located within the cylinder and rigidly connected with the pipe C by the bracket I, and provided with the passage $l$, valves D, rods F, springs J K, and the pipe L, communicating with the passage $l$, substantially as set forth.

9. A filter having inlet and outlet pipes and consisting of an upper and lower portion separated by the head $c$, bed $d$, pipes leading from the lower into the upper portion for the purpose of transferring the filter-bed, valves D, formed on the stem E, fitting around the pipes, said valves being adapted to cover and uncover openings leading from one portion into the other, standards $h$ for guiding the valves in their vertical movement, and means, substantially as described, for raising and lowering said valves, substantially as set forth.

Signed at New York, in the county of New York and State of New York, this 19th day of May, A. D. 1885.

JOHN W. HYATT.

Witnesses:
 GEORGE COOK,
 ARTHUR L. HENTHORN.